Figure 1:
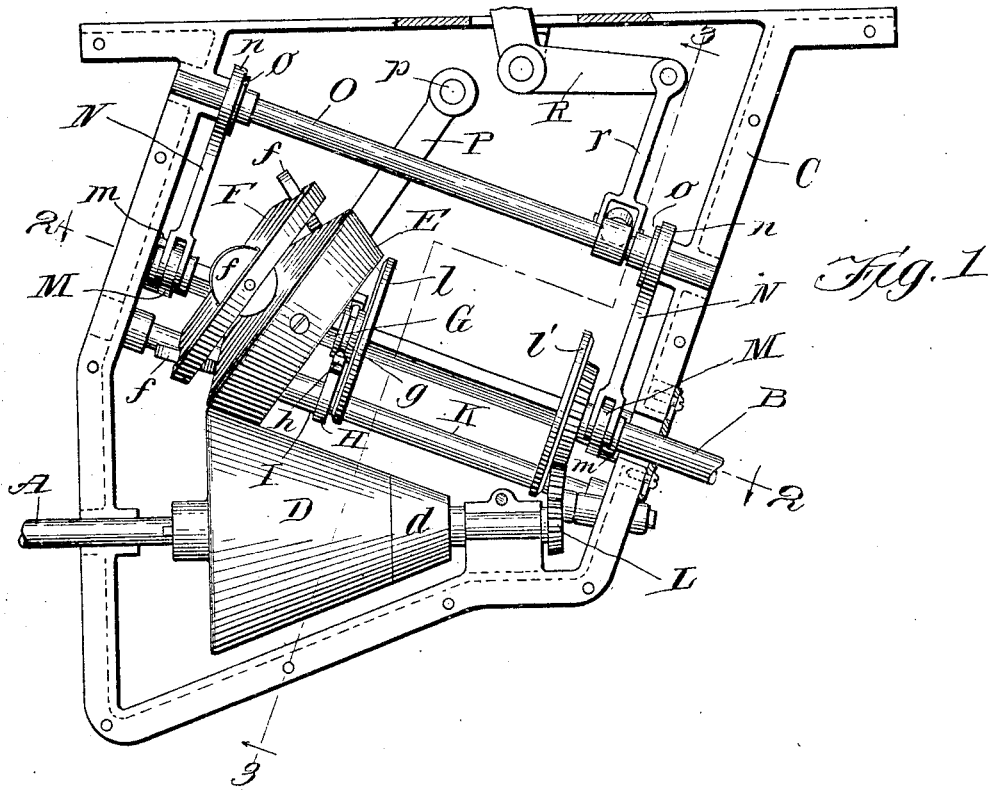

No. 869,501.

PATENTED OCT. 29, 1907.

O. & H. MATTHEI.
TRANSMISSION DEVICE.
APPLICATION FILED JULY 1, 1907.

2 SHEETS—SHEET 1.

Witnesses:
Harry S. Gaither
Ruby V. Nash

Inventors
Otto Matthei
and Henry Matthei
by Walter N. Champlin
their Att'y

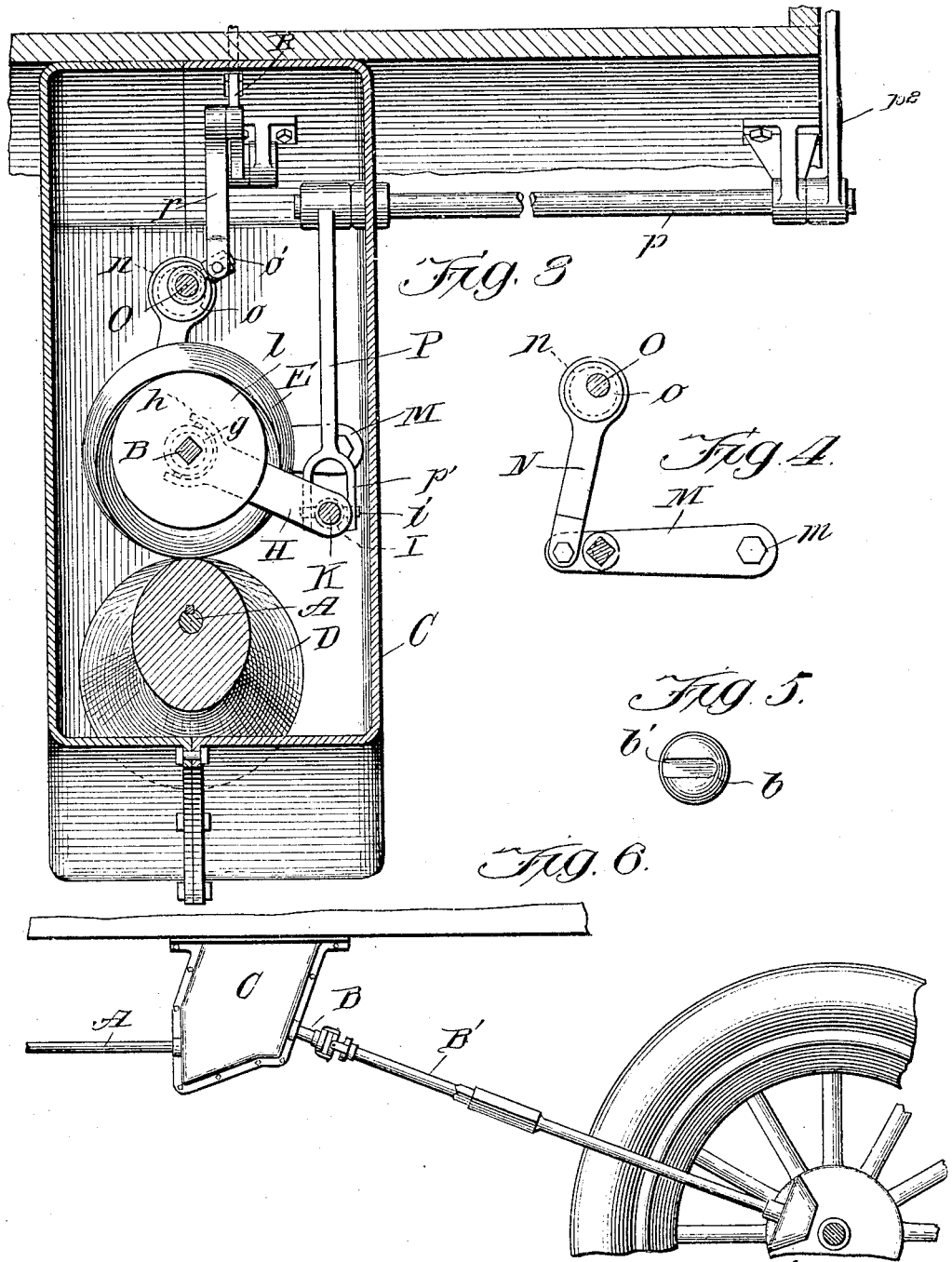

UNITED STATES PATENT OFFICE.

OTTO MATTHEI AND HENRY MATTHEI, OF CHICAGO, ILLINOIS.

TRANSMISSION DEVICE.

No. 869,501.  Specification of Letters Patent.  Patented Oct. 29, 1907.

Application filed July 1, 1907. Serial No. 381,604.

*To all whom it may concern:*

Be it known that OTTO MATTHEI and HENRY MATTHEI, citizens of the United States, residing at Chicago, county of Cook, State of Illinois, have invented a certain new and useful Improvement in Transmission Devices, and declare the following to be a full, clear, and exact description of the same, such as will enable others skilled in the art to which it pertains to make and use the same, reference being had to the accompanying drawings, which form a part of this specification.

Our invention relates to means for transmitting power and more particularly to a device for permitting a driven shaft to be operated at variable relative speeds with respect to the driving shaft.

A common form of speed changing transmission device consists of a driving member and a driven member in frictional engagement with each other and arranged to be moved relatively to each other in such a manner that the ratio of the speed of the driving member to the driven member may be varied. Heretofore in all devices of this general type there has been a waste of energy on account of the slippage which must necessarily occur at one point of engagement between the friction members when there is a tendency elsewhere to make the movement slower or more rapid as the case may be. Thus in the case of a disk drive, where the disks are arranged at right angles to each other and the driven disk is moved radially across the face of the other, all of the points on the driving disk along the line of contact between the disks move at speeds which vary from each other, the points farthest removed from the center traveling faster than those nearest the center: at the same time the corresponding points on the driven disk must all travel at the same linear speed because they are rotating about a common axis. It follows therefore that when the driven member has any appreciable thickness slippage must occur; and this slippage, and the consequent abrading action which follows, increases with the thickness of the driven member so that there is a limit beyond which it is not feasible to go in practice.

The object of the present invention is to provide a variable speed transmission device in which no energy is wasted due to a slipping or grinding action between the driving and driven members.

To the above end the present invention consists in a construction and arrangement of parts whereby a perfect rolling action is obtained between the driving and driven members throughout their entire range.

Figure 2:
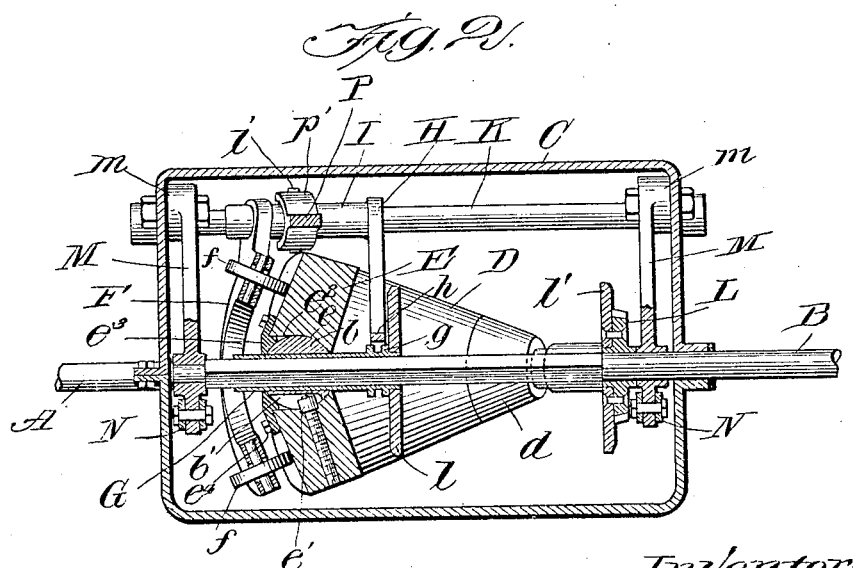

The various features of novelty which characterize our invention will be hereinafter pointed out with particularity in the appended claims, but for a full understanding of the invention and its object and advantages reference is to be had to the following detailed description taken in connection with the accompanying drawings, wherein:

Figure 1 is a side elevation of a transmission device arranged in accordance with a preferred form of our invention, one side of the housing being removed; Fig. 2 is a section on line 2—2 of Fig. 1 looking in the direction of the arrows; Fig. 3 is a section taken on line 3—3, Fig. 1, looking in the direction of the arrows; Figs. 4 and 5 are details; and Fig. 6 shows the device in position on an automobile or the like.

In the drawings we have illustrated our invention as embodied in a friction drive wherein two engaging friction cones are employed, since this is the preferred form; but it will, of course, be understood that in its broader aspects our invention is not confined in its application to cone-shaped driving and driven members.

Referring to the drawings, A indicates a driving shaft and B a driven shaft. The shaft A may be operated from any suitable source of power and the driven shaft may be attached to any part or machine which it is desired to drive. The two shafts are supported in any suitable bearings, as for example, in a housing C; and are arranged at an angle to each other, the angle being such that the shaft B is parallel to the adjacent element of the driving cone D lying in the plane of the shafts. On the driven shaft there is arranged a second cone E, the angle of which is the same as the angle of the cone D. The member E is mounted on its shaft in such a manner that when the two cones are brought into engagement with each other the contacting elements coincide exactly. In other words, the two cones are in true rolling engagement. Therefore when the driving shaft is operated so as to rotate the member D, the frictional engagement between the member D and the member E causes the latter to rotate without any loss of energy or wear upon the members due to a grinding or abrading action between the engaging portions of the friction members.

The driven member is mounted on its shaft in such a manner that it may be moved longitudinally thereof in order to bring it into engagement with the driving member at any desired point. As the driven member is moved from the base toward the apex of the driving member, the relative speed of the driven member is reduced. The driven member may be variously supported on its shaft, but the arrangement shown in the drawings is a convenient and satisfactory one. Instead of mounting the friction member directly on the shaft, there is placed between it and the shaft a sphere which is arranged to slide upon the shaft but is held against rotation thereon. The cone is provided at its center with a spherical recess or socket e which closely surrounds the sphere so that the cone is free to oscillate about the sphere in any direction. In order to prevent the cone from moving on the spherical support so as to oscillate or rotate about the axis of the driven shaft, there is provided a pin or roller $e'$ which projects from the cone into an elongated slot $b'$ in the member $b$;
this slot being arranged parallel to the axis of the driven shaft and of such width that there is no lost motion between it and the member $e'$ in the transverse direction. By this arrangement the axis of the member is arranged at such angle to the axis of the supporting shaft that there is always one element of the cone which is parallel to the shaft, and therefore parallel to the adjacent element on the driving cone. As the member E revolves it oscillates on the central ball, the pin or roller $e'$ moving back and forth in the slot $b'$. Instead of placing the center of the spherical support on the line joining the center of one element of the cone to the center of the element diametrically opposite, we prefer to place it at the point of intersection between the axis of the cone and a line drawn at right angles to one of the elements at a point midway between its ends. By this arrangement the thrust between the two cones is at right angles to the driven shaft and there is no tendency to tilt the driven cone as there would be if the spherical support were otherwise arranged. In order to further steady the driven cone we provide a ring-shaped member F which surrounds but does not engage the driven shaft. This member is provided with rollers $f$ which engage the base of the driven cone and positively prevent tilting thereof from any cause.
The member F with its roller is rigidly supported as will be hereinafter described so as to maintain a constant position with respect to the cone.

In order that the several parts heretofore described may be readily manufactured and assembled, we prefer to make the driven shaft rectangular or of some cross-section other than circular and to secure the spherical supporting member $b$ upon a sleeve G which closely fits the shaft but is free to slide thereon. The socket $e$ in the cone is made cylindrical at one side as at $e^2$ so that the sleeve and its sphere may be slipped into place through that side of the socket. After the sleeve and sphere are in place the open end of the socket is closed and the spherical contour thereof completed by means of a detachable plate $e^3$ which is secured in any suitable manner, as by means of screws $e^4$, upon the base of the cone. Near one end of the sleeve is a grooved boss $g$ which is adapted to be engaged by a fork $h$ at the end of an arm H. The sleeve and arm are thus united so that they are compelled to move together axially of the shaft; but the sleeve is free to rotate within the fork at the end of the arm. The arm H and the member F may conveniently be rigidly secured to or formed on a sleeve I which slidably surrounds a shaft K fixed in the housing so as to be parallel to the driven shaft. It will be seen that by moving the sleeve I the driven cone is moved axially of the shaft due to the connection between the sleeve G and the arm H and also the engagement between the rollers $f$ and the base of the cone. The sleeve G serves also to support one member $l$ of a friction clutch consisting of the member $l$ and a second member $l'$ which is loosely mounted upon the driven shaft B. The members $l$ and $l'$ may be simple friction disks of any usual type and their purpose, as will hereinafter appear, is to cause the driven shaft to be rotated in the opposite direction from that when the driving connection is through the friction cones. The member $l'$ is therefore so located on the shaft that it is not engaged by its complementary member until the driven cone has been moved so far axially of the shaft that it has passed beyond the effective portion of the driving cone. The member $l'$ is driven directly from the shaft A through a train of gearing L, this gearing being so arranged that the disk $l$ always rotates in the opposite direction from the direction of rotation of the member E when the latter member is in operative relation to the driving cone. The driving cone is provided with a section $d$ at its smaller end, which section is loose upon the shaft, so that when the member E is in engagement therewith the driving connection is interrupted. The parts are so proportioned and arranged that the member E engages with the idler $d$ before the clutch member $l$ and $l'$ come into engagement. Consequently the operating lever may have an off or neutral point at which there is no driving connection either for forward or reverse, and when the operating lever is moved in one direction from the neutral position a gradually increasing speed of the driven shaft may be obtained while upon moving the lever in the opposite direction a reverse movement of the driven shaft results.

In order that the cones may be held positively out of engagement with each other and be adapted to be moved into and out of engagement with each other at will, we have provided means for moving the driven shaft slightly in a direction at right angles to its axis. This movement need not be great, but only sufficient to carry the driven cone out of contact with the companion cone. To this end the driven shaft is journaled in the ends of a pair of levers M which are pivotally supported at one end within the housing as at $m$. To the free ends of these levers are hinged a pair of links N. These links at their free ends surround a shaft O which is provided with a pair of eccentrics $o$ arranged within bearings $n$ within the ends of the links. These eccentrics are so positioned that upon rotating the shaft $o$ in one direction or the other the levers M are caused to oscillate in one direction or the other so as to carry the driven cone into or out of engagement with the companion cone according to the direction of rotation of the shaft O.

It will now be seen that by providing suitable levers or handles for controlling the position of the sleeve I upon the shaft K and the angular position of the shaft O, the driven shaft may be operated in one direction at any desired speed within the range of the transmission device, or it may be operated in the reverse direction; furthermore the friction cones may be carried positively out of engagement with each other so as to prevent all possibility of a driving connection between them accidentally or otherwise. The sleeve I may be reciprocated by means of a lever P secured to a shaft $p$ which is journaled in any suitable manner within the housing. At the free end of the lever P is a fork $p'$ which engages trunnions $i$ projecting from the sleeve I. The shaft $p$ may extend beyond the housing to any suitable point and be there provided with a lever $p^2$ for operating it. The shaft O may conveniently be operated by means of a bell-crank lever R which is pivoted within the housing and has one arm projecting therefrom. The other arm of the lever is connected to a pin $o'$ projecting laterally from the shaft O, preferably by means of a link $r$. As the lever R is oscillated the shaft O is caused to rotate sufficiently to carry the friction cones into or out of engagement with each other, as the case may be.

In Fig. 6 we have shown the device as applied to an automobile. The driven shaft B is extended as at B' to the rear axle as is usual in direct drives. When the device is used on an automobile, the shaft $p$ may conveniently be extended to the side of the automobile so as to place the lever $p^2$ within convenient reach of an operator seated within the vehicle. The lever R may in such case project upwardly through the floor of the vehicle so as to be within reach of the foot of an operator.

It will now be seen that we have devised a variable-speed transmission device in which there is at all times a true rolling motion between the friction elements; in which the thrust is at all times normal to the driven shaft; and which is simple and compact in construction, comprising no delicate parts apt to get out of order.

Having now fully described my invention, what I claim as new and desire to secure by Letters Patent is:

1. In a variable-speed transmission device, a pair of similarly-tapered coöperating friction cones, a shaft arranged parallel to the adjacent element of one of said cones, and a supporting bearing between said shaft and the other cone which permits the cone to revolve about its own axis when its peripheral surface is in rolling engagement with the surface of the coöperating cone.

2. In a variable-speed transmission device, a pair of similarly-tapered coöperating friction cones, a shaft arranged parallel to the adjacent element of one of said cones, and a supporting bearing between said shaft and the other cone which permits the cone to revolve about its own axis when its peripheral surface is in rolling engagement with the surface of the coöperating cone, and means for moving the one cone axially of the supporting shaft.

3. In a variable-speed transmission device, a pair of similarly-tapered coöperating friction cones, a revoluble member arranged parallel to and supported for movements parallel to an element of one of the cones, means for securing the other cone on said member so as to rotate said member while rolling upon the other cone about its own axis.

4. In a variable-speed transmission device, a driving cone, a driven cone, a shaft extending through the driven cone in parallelism with the adjacent element of the driving cone, a member slidably mounted on said shaft but held against rotation thereon, a spherical boss surrounding said member, said driven cone having a spherical socket fitting said boss, stops between said boss and the cone for permitting the cone to revolve about its own axis while in rolling engagement with the driving cone but preventing rotation of the cone upon said member, and means for moving said member along said shaft.

5. In a variable-speed transmission device, a driving cone, a driven cone, a shaft extending through the driven cone in parallelism with the adjacent element of the driving cone, a member slidably mounted on said shaft but held against rotation thereon, a spherical boss surrounding said member, said driven cone having a spherical socket fitting said boss, stops between said boss and the cone for permitting the cone to revolve about its own axis while in rolling engagement with the driving cone but preventing rotation of the cone upon said member, means for moving said member along said shaft, and means for moving said shaft from and towards the driving cone.

6. In a variable-speed transmission device, a driving cone, a driven shaft supported in parallelism to the adjacent element of said cone, a driven cone, a ball and socket bearing between said shaft and the driven cone arranged to lock the cone in driving engagement with the shaft and at the same time rotate about its own axis while in rolling contact with the driving cone, and means for shifting the driven cone and its bearing along the shaft.

7. In a variable-speed transmission device, a driving cone, a driven shaft supported in parallelism to the adjacent element of said cone, a driven cone, a ball and socket bearing between said shaft and the driven cone arranged to lock the cone in driving engagement with the shaft and at the same time rotate about its own axis while in rolling contact with the driving cone, means for shifting the driven cone and its bearing along the shaft, and means for moving said shaft from and towards the driving cone.

8. In a variable-speed transmission device, a driving cone, a driven shaft supported in parallelism to the adjacent element of said cone, a driven cone, a ball and socket bearing between said shaft and the driven cone arranged to lock the cone in driving engagement with the shaft and at the same time rotate about its own axis while in rolling contact with the driving cone, means for shifting the driven cone and its bearing along the shaft, and an anti-friction support arranged to travel with the driving cone along the shaft and hold the cone at the proper angle to the shaft to maintain the contacting elements of the two cones in parallelism.

9. In a variable-speed transmission device, a driving cone, a driven shaft supported in parallelism to the adjacent element of said cone, a driven cone, a ball and socket bearing between said shaft and the driven cone arranged to lock the cone in driving engagement with the shaft and at the same time rotate about its own axis while in rolling contact with the driving cone, means for shifting the driven cone and its bearing along the shaft, a friction disk loose on said shaft, gearing between said disk and the driving cone, and a complementary friction disk connected to the driving cone, said disks being so positioned and arranged that they do not engage until the driving connection between the cones is interrupted, and the said gearing being so constructed that the friction disks serve to rotate the shaft in the opposite direction from that in which it is rotated by the cones.

10. In a variable-speed transmission device, a driving cone, a driven shaft supported in parallelism to the adjacent element of said cone, a driven cone, a ball and socket bearing between said shaft and the driven cone arranged to lock the cone in driving engagement with the shaft and at the same time rotate about its own axis while in rolling contact with the driving cone, means for shifting the driven cone and its bearing along the shaft, said bearing being in a plane passing through the center of and at right angles to the element of the cone in engagement with the driving cone.

11. In a variable speed transmission device, a revoluble member having a friction surface which recedes uniformly from the axis of rotation, a coöperating friction cone engaging with said friction surface, a shaft arranged parallel to the engaging elements of said member and said cone, and a supporting bearing between said shaft and the cone which permits the cone to revolve about its own axis while its peripheral surface is in rolling engagement with the surface of the coöperating cone.

12. In a variable speed transmission device, a revoluble member having a friction surface which recedes uniformly from the axis of rotation, a coöperating friction cone in engagement with said surface, a shaft arranged parallel to the engaging elements of said member and said cone, and a supporting bearing between said shaft and the cone arranged in a plane at right angles to and intermediate the ends of said engaging elements.

13. In a variable speed transmission device, a revoluble member having a friction surface which recedes uniformly from the axis of rotation, a friction cone engaging with said surface, a shaft arranged parallel to the engaging elements of said member and said cone, and a supporting bearing between said shaft and the cone which permits the cone to revolve about its own axis when its peripheral surface is in rolling engagement with said member, said bearing being in a plane at right angles and intermediate the ends of said engaging elements.

14. In a variable speed transmission device, a revoluble member having a friction surface which recedes uniformly from the axis of rotation, a friction cone engaging with said surface, a shaft arranged parallel to the engaging elements of said member and said cone, a supporting bearing between said shaft and the cone which permits the cone to revolve about its own axis when its peripheral surface is in rolling engagement with said member, said bearing being in a plane at right angles and intermediate the ends of said engaging elements, and means for moving said cone and said bearing longitudinally of the shaft.

In testimony whereof, we sign this specification in the presence of two witnesses.

OTTO MATTHEI.
HENRY MATTHEI.

Witnesses:
 RUBY V. NASH,
 HARRY S. GAITHER.